US007004112B2

(12) United States Patent  
Gorans (10) Patent No.: US 7,004,112 B2
(45) Date of Patent: Feb. 28, 2006

(54) AUTOMATED HATCHLING PROCESSING METHOD AND SYSTEM

(75) Inventor: Marc S. Gorans, Willmar, MN (US)

(73) Assignee: Nova-Tech Engineering, Inc., Willmar, MN (US)

( * ) Notice: Subject to any disclaimer, the term of this patent is extended or adjusted under 35 U.S.C. 154(b) by 6 days.

(21) Appl. No.: 10/702,370

(22) Filed: Nov. 6, 2003

(65) Prior Publication Data

US 2005/0098121 A1 May 12, 2005

(51) Int. Cl.
*A01K 31/00* (2006.01)
*A01K 45/00* (2006.01)

(52) U.S. Cl. ..................................... 119/713
(58) Field of Classification Search .............. 119/713, 119/714, 716, 843
See application file for complete search history.

(56) References Cited

U.S. PATENT DOCUMENTS

| | | | |
|---|---|---|---|
| 2,713,325 A * | 7/1955 | Bowers ..................... 119/716 |
| 3,774,578 A * | 11/1973 | Randolph et al. ........... 119/714 |
| 3,994,292 A | 11/1976 | Goodwin |
| 4,177,810 A | 12/1979 | Gourlandt |
| 4,375,814 A | 3/1983 | Gourlandt |
| 4,417,663 A | 11/1983 | Suzuki |
| 4,446,819 A | 5/1984 | Gourlandt |
| 4,449,968 A | 5/1984 | Peterson |
| 4,681,565 A | 7/1987 | Gourlandt |
| 4,850,997 A | 7/1989 | DuBose |
| 4,863,443 A | 9/1989 | Hornung |
| 4,951,610 A | 8/1990 | Gourlandt |
| 5,195,925 A | 3/1993 | Gorans et al. |
| 5,312,353 A | 5/1994 | Boggess et al. |
| 5,651,731 A | 7/1997 | Gorans et al. |
| 6,029,080 A | 2/2000 | Reynells et al. |
| 6,149,956 A | 11/2000 | Boerjan |
| 6,396,938 B1 | 5/2002 | Tao et al. |
| 6,443,102 B1 | 9/2002 | Schepers et al. |
| 6,512,839 B1 | 1/2003 | Toelken |
| 6,565,533 B1 | 5/2003 | Smith et al. |
| 6,634,319 B1 * | 10/2003 | Zermoglio et al. ........ 119/713 |
| 2001/0035370 A1 | 11/2001 | Yavnai et al. |

FOREIGN PATENT DOCUMENTS

| | | |
|---|---|---|
| EP | 0 890 838 B1 | 3/2002 |
| WO | 00/01302 A1 | 1/2000 |
| WO | 02/083848 A2 | 10/2002 |

* cited by examiner

*Primary Examiner*—Robert P. Swiatek
(74) *Attorney, Agent, or Firm*—Mueting, Raasch & Gebhardt, P.A.

(57) ABSTRACT

Hatchling processing methods and systems that provide for the processing of hatchlings at a plurality of processing stations, with the hatchlings being transferred between stations using an automated conveying system. Each of the hatchlings is retained in a hatchling carrier designed to be conveyed by the automated conveying system. Each of the hatchling carriers is preferably designed to retain only one hatchling at a time. The systems and methods may also include identification tags that may be used to direct the hatchling through the processing system with the automated conveying system. The identification tags may be associated with the hatchlings themselves or they may be associated with the hatchling carriers.

30 Claims, 5 Drawing Sheets

AUTOMATED HATCHLING PROCESSING METHOD AND SYSTEM

BACKGROUND

The present invention relates generally to a method and system for processing hatchlings, where hatchlings are defined as young birds (e.g., chickens, turkeys, ducks, geese, etc.) with an age of one week or less.

The processing of hatchlings may include activities such as sexing to determine gender, inoculating or otherwise medicating the hatchlings, feeding the hatchlings, weighing the hatchlings, treating the beaks and/or claws of the hatchlings (to, e.g., retard their growth), etc. Conventionally, the hatchlings are handled manually, i.e., individuals must physically hold the hatchlings and either perform the process while holding the hatchling or load the hatchling into equipment in which one of the processes is performed.

SUMMARY OF THE INVENTION

The hatchling processing methods and systems of the present invention provide for the processing of hatchlings at a plurality of processing stations, with the hatchlings being transferred between stations using an automated conveying system. Each of the hatchlings is retained in a hatchling carrier designed to be conveyed by the automated conveying system. Each of the hatchling carriers is preferably designed to retain only one hatchling at a time.

The systems and methods of the present invention also include identification tags that may be used to direct the hatchling through the processing system with the automated conveying system. The identification tags may be associated with the hatchlings themselves or they may be associated with the hatchling carriers. Identification tags may take any suitable form, including but not limited to bar codes, radio frequency identification (RFID) tags, alphanumeric indicia, etc. In some systems/methods, the identification tag may not be embodied in a physical form, e.g., the identification tag may be provided in software only. The identification tags may be based, at least in part, on one or more characteristics of the hatchling they identify (e.g., weight, gender, age, species, etc.) or they may be assigned without consideration for any physical characteristic of the particular hatchling.

The methods and systems of the present invention also involve transporting each loaded hatchling carrier between the processing stations using an automated conveying system connecting the processing stations. As used herein, an "automated conveying system" means a conveying system that is capable of transporting hatchlings between processing stations without direct human intervention, i.e., the automated conveying system does not require a human to carry or otherwise transport the hatchlings between processing stations.

The methods further involve the determination of a processing sequence for each hatchling. The processing sequence is a selection of the processing stations at which each hatchling is to undergo processing. For example, each hatchling may be processed at only some of the available processing stations in a given processing system. In other instances, the processing sequence may involve a selection of the type of processing that may be performed at a given processing station where, for example, the processing of a particular hatchling may change based on the hatchling's weight, age, gender, etc. As a result, the processing sequences for at least two hatchlings will differ in the methods of the present invention.

The processing sequences may be determined as the hatchling enters the system, i.e., before it is processed at the processing stations. In other instances, one or more characteristics of the hatchling may be identified (e.g., the hatchling's weight, age, gender, species, etc.) at one or more processing stations before selecting the remaining processing stations of the hatchling's processing sequence. As a result, one or more of the subsequent processing stations can be selected based on the identified characteristics of the hatchling.

Collection of data regarding the physical characteristics may preferably be performed at processing stations that may be characterized as "data collection stations." A data collection station of the present invention is a processing station at which data regarding one or more physical characteristics of a hatchling may be obtained. Examples include, but are not limited to, weighing stations, sexing stations, imaging stations, etc. The processing systems and processing sequences of the present may preferably include at least one data collection station. The data collection stations may preferably be located at any point within the system or, form methods, may preferably be accessed at any time during processing of a hatchling.

In contrast to data collection stations, the systems/methods of the present invention may also preferably include "functional stations." A functional station of the present invention is a processing station at which the hatchling is changed in one or more aspects. Examples include, but are not limited to, beak treatment stations, claw treatment stations, marking stations, cleaning stations, gavage stations, inoculation stations, etc. The processing systems and processing sequences of the present may preferably include at least one functional station. The functional stations may preferably be located at any point within the system or, form methods, may preferably be accessed at any time during processing of a hatchling.

Although processing stations may be identified as "data collection stations" or "functional stations," a single processing station may be both a data collection station and a functional station. For example, it may be possible to both clean and weigh a hatchling at a single processing station. Many other combinations of data collection and functional stations are possible within the scope of the present invention.

The processing sequences of the present invention may be identified as the hatchling passes through the processing system. In other words, selection of the processing stations at which a particular hatchling is to undergo processing may be made as the hatchling reaches each particular station. Such a method may involve encoding information regarding one or more characteristics of the hatchling in the identification tag associated with the hatchling or storing such information in a database location associated with the particular hatchling. In either case, a decision as to the processing of a particular hatchling at a particular processing station is made on an as needed basis, i.e., as the hatchling approaches or is located within the processing station.

The processing methods and systems may be organized serially such that each hatchling passes through every processing station in the system. In such a system, the processing stations may or may not be activated as the hatchling passes through the processing station depending on whether the hatchling is to undergo the process performed at that station. Alternatively, the processing methods and systems may be organized in parallel such that hatchlings in the hatchling carriers can be directed to bypass processing stations that perform processes that are not selected for those particular hatchlings using the automated conveying system. In another variation, some of the processing stations can be arranged serially while other processing stations may be arranged in parallel.

As discussed herein, it may be desirable to store information regarding each hatchling in a database or in the identification tag associated with each hatchling. Encoding information regarding each hatchling into the identification tag associated with each hatchling can be useful in processing where, for example, the information is read or retrieved at a later time to determine whether the hatchling should be processed at that station or what type of processing should be performed at that particular station. A potential advantage of a centralized database is that data on the hatchlings can be retrieved at a later time for trend analysis, quality control, etc.

In one aspect, the present invention provides a method for processing hatchlings by loading a hatchling into each hatchling carrier of a plurality of hatchling carriers to provide a plurality of loaded hatchling carriers, wherein each loaded hatchling carrier is capable of restraining only one hatchling at a time; determining a processing sequence in a processing system including a plurality of processing stations for each loaded hatchling carrier, wherein determining the processing sequence involves selecting two or more of the processing stations at which the hatchling will undergo processing; processing each hatchling in each of the loaded hatchling carriers in the two or more selected processing stations of the processing sequence; and transporting each loaded hatchling carrier between the two or more processing stations using an automated conveying system connecting the plurality of processing stations; wherein each hatchling carrier comprises an identification tag associated therewith; and wherein the processing sequences for two or more of the loaded hatchling carriers are different.

In another aspect, the present invention provides a method for processing hatchlings by loading a hatchling into each hatchling carrier of a plurality of hatchling carriers to provide a plurality of loaded hatchling carriers, wherein each loaded hatchling carrier is capable of restraining only one hatchling at a time; assigning an identification tag to each hatchling carrier, determining a processing sequence in a processing system including a plurality of processing stations for each loaded hatchling carrier, wherein determining the processing sequence involves selecting two or more of the processing stations at which the hatchling will undergo processing, wherein the plurality of processing stations includes at least one data collection station at which hatchling data is collected and at least one functional station at which the hatchling is changed, and further wherein selecting two or more of the processing stations at which the hatchling will undergo processing involves selecting at least one data collection station and at least one functional station; identifying a characteristic of each hatchling in the loaded hatchling carriers, wherein determining the processing sequence is at least partially based on the identified characteristic of the hatchling in the loaded hatchling carrier, processing each hatchling in each of the loaded hatchling carriers in the two or more selected processing stations of the processing sequence; and transporting each loaded hatchling carrier between the two or more processing stations using an automated conveying system connecting the plurality of processing stations; wherein the processing sequences for two or more of the loaded hatchling carriers are different.

In another aspect, the present invention provides an automated hatchling processing system including a plurality of processing stations including at least one data collection station capable of collecting data regarding a hatchling and at least one functional station capable of changing the hatchling; an automated conveying system connecting the plurality of processing stations; a plurality of hatchling carriers adapted to travel along the automated conveying system between the plurality of processing stations, wherein each hatchling carrier is capable of restraining only one hatchling at a time; an identification tag associated with each hatchling carrier of the plurality of hatchling carriers; and a control system operatively connected to the automated conveying system and the plurality of processing stations, the control system routing the plurality of hatchling carriers along the automated conveying system and activating the plurality of processing stations as needed.

The above summary of the present invention is not intended to describe each embodiment or every implementation of the present invention. Advantages, together with a more complete understanding of the invention, will become apparent and appreciated by referring to the following detailed description and claims taken in conjunction with the accompanying drawings.

DETAILED DESCRIPTION OF ILLUSTRATIVE EMBODIMENTS OF THE INVENTION

In the following detailed description of illustrative embodiments, reference is made to the accompanying figures of the drawing which form a part hereof, and in which are shown, by way of illustration, specific embodiments in which the invention may be practiced. It is to be understood that other embodiments may be utilized and structural changes may be made without departing from the scope of the present invention.

Figure 1:
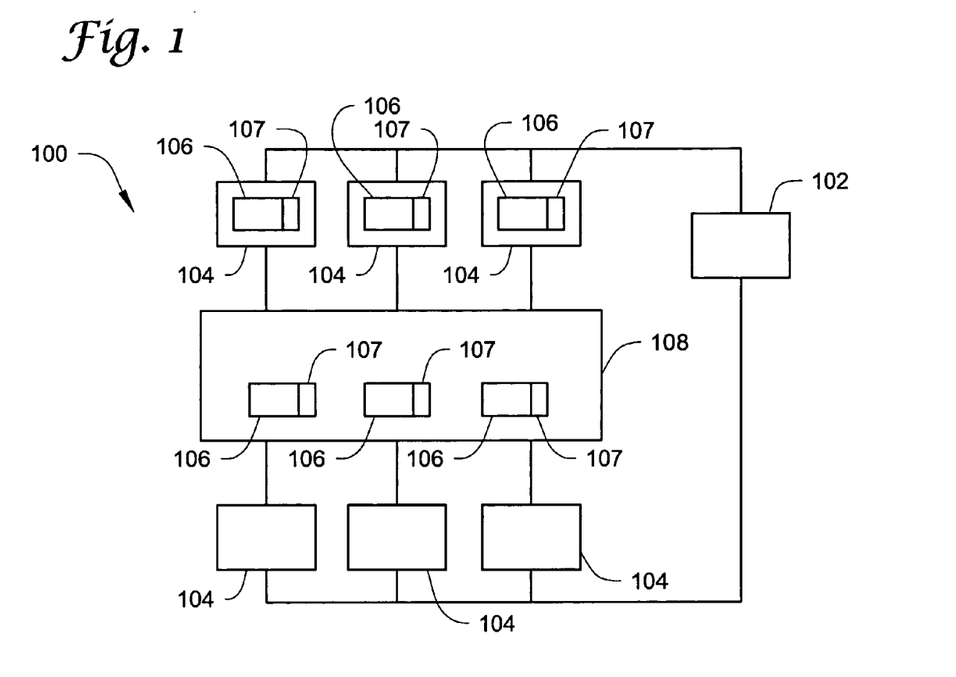
FIG. 1 is a block diagram of one example of a hatchling processing system according to the present invention.

FIG. 1 is a block diagram that is illustrative of one embodiment of a modular hatchling processing system 100 according to the present invention. The system 100 includes a control system 102, processing stations 104, hatchling carriers 106, and a conveying system 108. In the depicted embodiment, the control system 102 is operably connected to the processing stations 104 and the conveying system 108.

The processing stations 104 are provided to perform one or more processes on hatchlings routed to the processing station 104 on hatchling carriers 106. Each processing station 104 may perform one or more processes on a hatchling directed to the processing station 104 by the conveying system 108. Examples of processing stations 104 include, but are not limited to a loading station, a cleaning station, a weighing station, a sexing station, a beak treatment station, a claw treatment station, etc.

As discussed above, processing stations 104 of the present invention may be broadly characterized as data collection stations, functional stations, or both. A data collection station of the present invention is a processing station at which data regarding one or more physical characteristics of a hatchling may be obtained. Examples of data collection stations include, but are not limited to, weighing stations, sexing stations, imaging stations, etc. A functional station of the present invention is a processing station at which the hatchling is changed in one or more aspects. Examples of functional stations include, but are not limited to, beak treatment stations, claw treatment stations, marking stations, cleaning stations, gavage stations, inoculation stations, etc.

The processing systems and processing sequences of the present may preferably include at least one data collection station and at least one functional station. Either type of processing station 104 may preferably be located at any point within the system or, for methods, may preferably be accessed at any time during processing of a hatchling. Furthermore, a single processing station 104 may operate as both a data collection station and a functional station. For example, a single processing station 104 may clean and sex a hatchling.

Processing stations 104 may be operated automatically or manually. By automatic (and its variations) we mean that the process or processes performed at the processing station are carried out in the absence of direct human intervention. For example, a processing station at which the weight of a hatchling is determined may be carried out automatically without the need of direct human intervention by weighing the hatchling and the hatchling carrier, followed by subtracting the (known) weight of the carrier.

In contrast, a manual processing station requires direct human intervention to perform the process of the processing station. For example, a processing station at which the gender of a hatchling is determined (sometimes referred to as "sexing" a hatchling) may be a manual processing station at which one or more individuals examine the hatchlings to determine their gender. An automated processing station may be defined as one in which the function is performed without direct human intervention. The potential advantages of an automated processing station may be reduced labor costs, more reliable operation, and faster operation.

The hatchling carriers 106 are preferably designed to retain one hatchling for processing at selected processing stations 104. In the depicted system 100, some of the processing stations 104 are occupied by hatchling carriers 106. The hatchling carriers 106 may take any suitable shape or form so long as the hatchling carriers can be individually routed along the conveying system 108 and can restrain a hatchling while it is being transported and processed through the system. Hatchling carriers 106 may be provided in different sizes or formats to accommodate different sizes, different breeds, and/or different species of hatchlings. The hatchling carriers 106 may restrain hatchlings in any suitable manner, e.g., within an enclosure, by capturing any suitable portion or portions of the hatchling's anatomy, etc. Examples of some restraint systems that may be used in connection with the hatchling carriers of the present invention are described in, e.g., U.S. Pat. No. 4,375,814 (Gourlandt) and U.S. Pat. No. 5,651,731 (Gorans et al.).

The hatchling carriers 106 may each preferably include an identification (ID) tag to identify the hatchling carrier 106 to, e.g., the control system 102, each processing station 104, etc. The ID tag 107 may take any suitable form. Examples of some suitable forms may include, but are not limited to barcodes, radio frequency identification (RFID) devices, alphanumeric indicia, etc. The ID tags 107 are depicted as being attached to the hatching carriers 106, but it should be understood that they could alternatively be attached directly to the hatchling being processed.

In yet another variation, the ID tags 107 may not be provided in a physical embodiment at all, for example, the ID tags 107 may be provided in software used in the method or system. For example, the ID tags 107 may be assigned and tracked in software as the hatchling carrier 106 moves within the system.

The automated conveying system 108 is used to transport hatchling carriers to the different processing stations 104 of the system 100. The conveying system 108 may preferably be formed using conventional modular conveying systems.

In any processing system of the present invention, each section of the conveying system 108 may be powered and controlled separately if desired. Each section of the conveying system 108 may additionally have some intelligence and may communicate with other sections or the control system 102. A centralized control system may direct the activities and timing of the individual sections of the conveying system 108 or control of the entire conveying system 108 may be distributed to one or more sections of the conveying system 108.

The control system 102 may be used to control the transporting and processing of each hatchling carrier 106 in the system. The control system 102 may preferably communicate with each processing station 104 of the plurality of processing stations 104 and the conveying system 108.

The control system 102 may be centralized or distributed. A centralized control system 102 may preferably include a single computing element, in which all computing may be performed by the single computing element (although there may be backup or redundant computing elements that are used if the single computing element fails). A centralized control system 102 may typically include some type of network or bus through which the single computing element may communicate with all the elements of the system 100 that require direction from the control system 102.

A distributed control system 102 may include two or more computing elements controlling different components of the system 100. A distributed control system 102 may typically include a network that interconnects the computing elements with the different components they control and/or other computing elements, such that they may communicate and exchange information.

The control system 102 may preferably control the processing for each hatchling carrier 106 in the system, and the transportation of each hatchling carrier 106 from one processing station 104 to the next. For example, the control system 102 may communicate with a processing station 104 to configure the processing to be performed, and then may read back the status of the result when the processing is completed. In addition, the control system 102 may communicate with the conveying system 108 to determine a path that a hatching carrier 106 may traverse to be transported from a current processing station 104 to a next processing station 104. The processing performed on an individual hatchling carrier 106 may be defined by the sequence of processing stations 104 that the hatching carrier 106 traverses while in the system 100. The control system 102 may determine the sequence of processing stations 104 for each hatchling carrier 106 in the system 100, and further, may control the processing stations 104 and conveying system 108 to perform that processing sequence.

Each processing station 104 may have one or more status signals that may be read by the control system 102. For example, status signals may include, e.g., processing station power on; processing station occupied/available; processing complete; status information related to the specific processing and measurements, and/or a processing station problem alert. Each processing station 104 may be capable of receiving commands from the control system 102 and performing those commands. Example commands may include, e.g., control signals to perform specific processing and measurements; initiate processing; transfer hatchling carrier to the conveying system; read the ID tag on the hatching carrier, and/or reset the processing station.

Furthermore, a processing station 104 may be programmable (i.e., be capable of performing several different processes or variations of a process). The control system 102 may determine the specific process to be performed and may send commands to the processing station 104 to configure the processing station 104 to perform the selected process on a particular hatchling based on, e.g., one or more characteristics of the hatchling such as, for example, weight, age, gender, species, etc.

The system 100 of the present invention may preferably provide modularity through the use of standardized dimensions and designs for the hatchling carrier 106, the conveying system 108, and the processing station 104 interface to both the hatchling carrier 106 and the conveying system 108. The system 100 of the present invention may be based on a building block concept, for example, the conveying system 108 may be formed by combining various types of sections to form the required system.

Therefore, the system 100 of the present invention may preferably accommodate a range of system sizes, in terms of the number of processing stations 104 and the size of the conveying system 108. The size and extent of the conveying system 108 may be increased or decreased. Similarly, the number of processing stations 104 may be increased or decreased.

The conveying system 108 and the processing stations 104 may be arranged to provide serial connections between the different processing stations 104 or they processing stations 104 and conveying system 108 may be arranged to provide for parallel connectivity.

Figure 2:
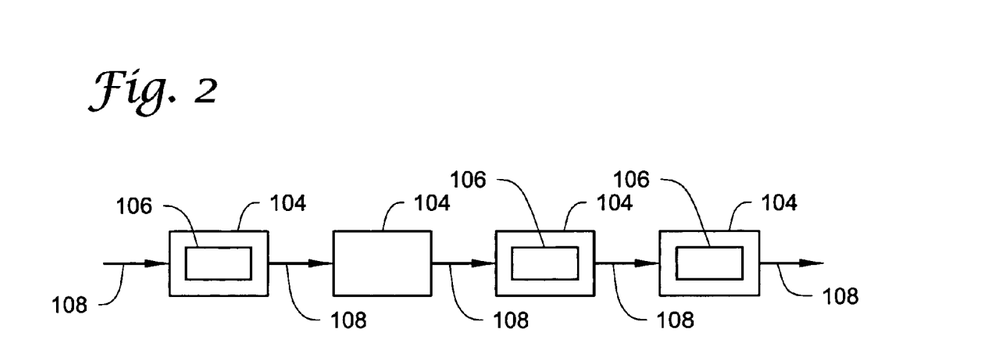
FIG. 2 depicts one example of a system with processing stations in a serial configuration.

One example of processing stations 104 arranged serially is depicted in FIG. 2 in which successive processing stations 104 are connected by portions of the conveying system 108. Some of the processing stations 104 are occupied by hatchling carriers 106. In such a system, each hatchling carrier 106 moving through the system would pass through all of the processing stations 104. If the process performed at a particular processing station 104 was not selected for a particular hatchling, the processing station 104 may not be activated while the loaded hatchling carrier 106 (i.e., the hatchling carrier with a hatchling) is passing through the processing station 104.

Figure 3:
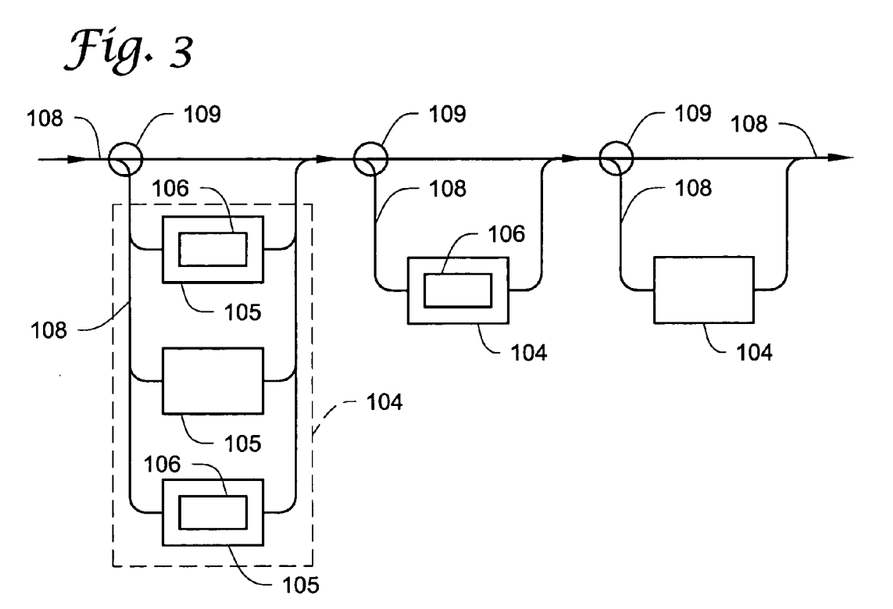
FIG. 3 depicts one example of a system with processing stations in a parallel configuration.

FIG. 3 depicts a system in which the processing stations 104 are arranged in parallel such that one or more of the processing stations 104 can be bypassed by the hatchling carriers 106 moving along the conveying system 108. At each of the processing stations 108, a junction 109 is provided that can route the hatchling carriers 106 into the processing station 104 or past it without requiring the hatchling carrier 106 to pass through the processing station 104.

Another optional feature depicted in FIG. 3 is that the first processing station 104 includes more than one bay 105 in which loaded hatchling carriers 106 may be processed at the same time. In the depicted system, two of the bays 105 are occupied by hatchling carriers 106. Multiple bays 105 may be provided at a processing station 104 that has, e.g., a longer processing time than the other processing stations 104. As a result, overall throughput of the system can be increased by controlling a potential bottleneck in the flow of hatchling carriers 106 processed by the system.

Figure 4:
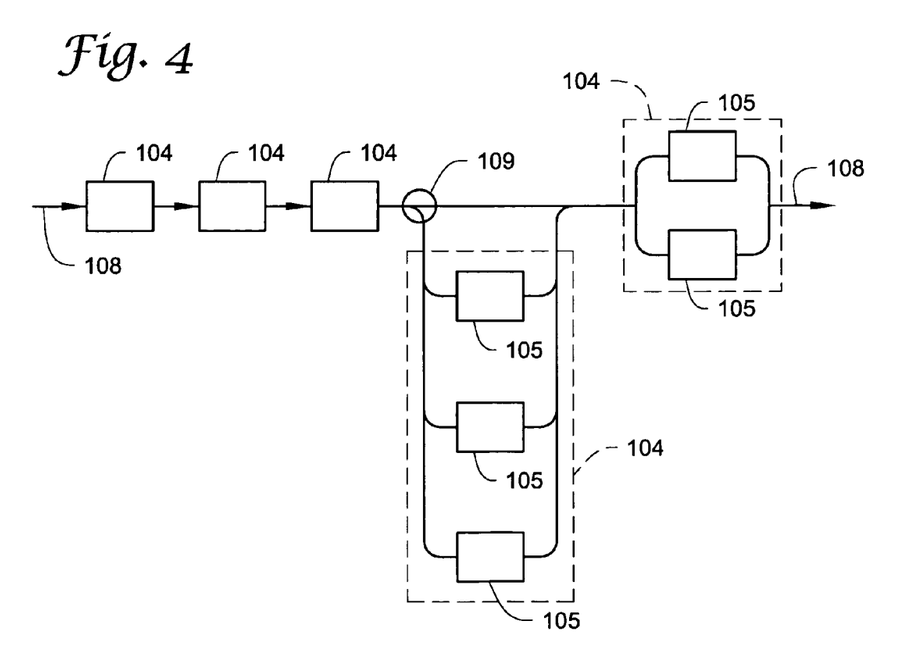
FIG. 4 depicts one example of a system with processing stations that are in both serial and parallel configurations.

FIG. 4 depicts still another option in a processing system according to the present invention in which the first three processing stations 104 are arranged serially and one of the processing stations 104 is arranged in parallel including a junction 109 at which a hatchling carrier can either be routed into the processing station 104 (and one of its bays 105) or past the processing station 104.

Another variation also depicted in connection with FIG. 4 is that a serially connected processing station 104 (the last processing station 104 in FIG. 4) can include multiple bays 105 for processing hatchlings.

Figure 5:
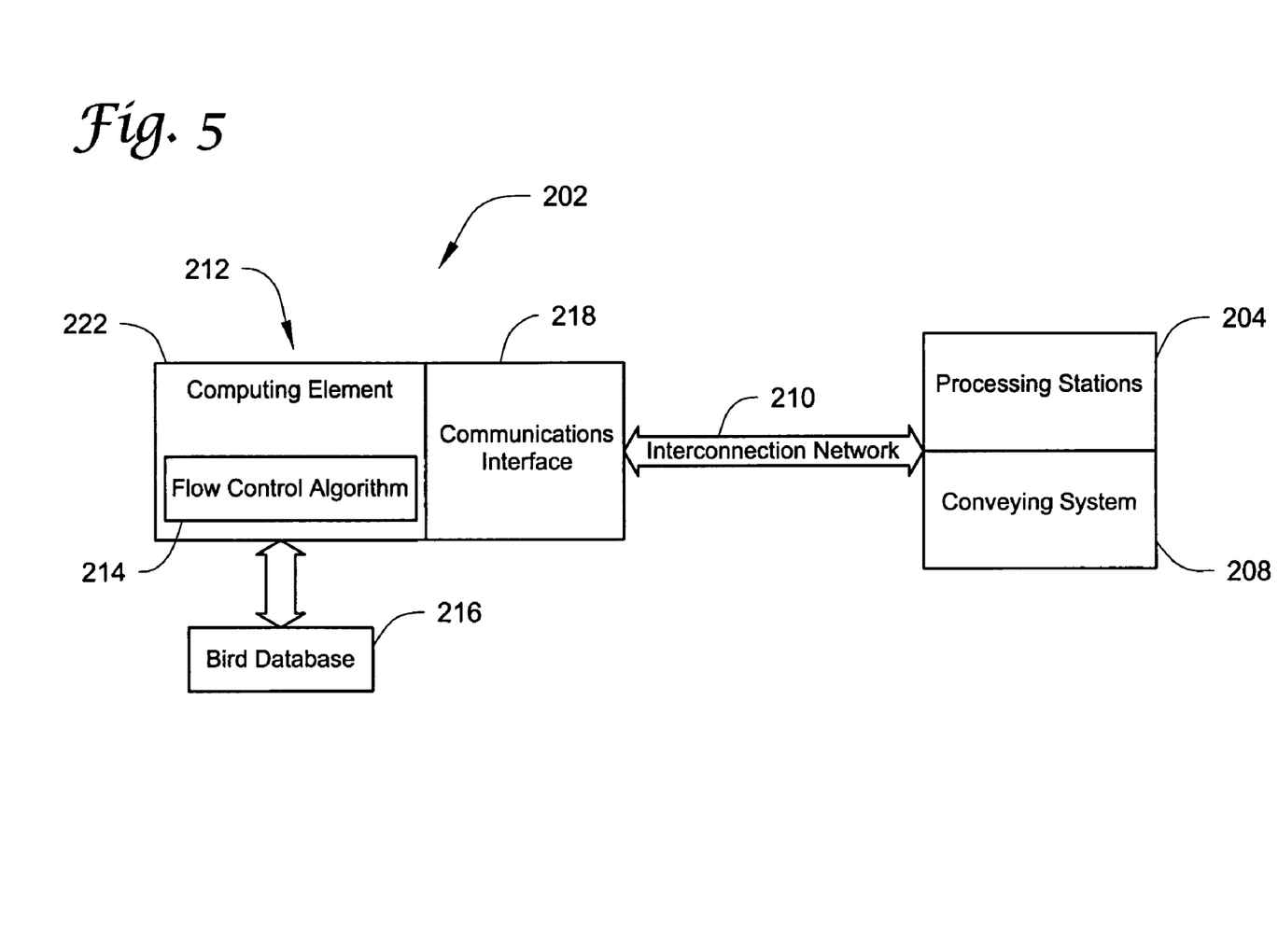
FIG. 5 illustrates one embodiment of a control system for use in connection with the present invention.

FIG. 5 is an expanded view of one embodiment of the control system 102 depicted in FIG. 1. The control system 202 of FIG. 5 may include a control apparatus 212 (e.g., a microprocessor, a personal computer, operating system software, driver software, and/or application software), a hatchling database 216, and an interconnection network 210. The control system 202 preferably controls the processing stations 204 and the conveying system 208.

The control apparatus 212 may include, e.g., a computing element 222, a flow control algorithm 214 and a communications interface 218. The control apparatus 212 may perform a variety of operations including, but not limited to: reading status from a processing station; sending a command to a processing station; storing data in the hatchling database 216; reading data from the hatchling database 216; determining a processing sequence for a loaded hatchling carrier, etc.

Through the use of the flow control algorithm 214, the control apparatus 212 may control the movement of hatchling carriers through the processing stations 204 and the processes performed on the hatchlings in the hatchling carriers. The flow control algorithm 214 may determine a processing sequence for each hatchling carrier through the various processing stations 204. In other words, the processing sequence of a hatchling carrier is the sequence of processing stations at which the a hatchling in a loaded hatchling carrier undergoes processing.

The hatchling database 216 may be used to store and access information regarding one or more characteristics of a hatchling in a hatchling carrier, as identified, for example, by the ID tag. The hatchling database 216 may also be used to store the results of the processing of a hatchling as reported by the various processing stations 204. The hatchling database 216 may preferably be managed by the control apparatus 212, through which all the reads and writes to the hatchling database 216 may be performed. The hatchling database 216 may be formed using any suitable database techniques known to one skilled in the art. In one embodiment, the hatchling database 216 may be used to gather and provide statistical data with respect to the hatchlings processed through the system.

Generally, the flow control algorithm 214 may determine, for each hatchling carrier, the sequence of processing stations the hatchling carrier may visit. The flow control algorithm 214 may also be used to control throughput such that the capacity of the system is not exceeded, i.e., that the number of hatchling carriers in the system does not exceed the capacity of the system. The flow control algorithm 214 may be defined by the user, providing flexibility in how each hatchling may be processed. The flow control algorithm 214 may include the capability to make decisions regarding the next station or stations to which a loaded hatchling carrier may be sent, based on the previous processing of the loaded hatchling carrier as reflected by data stored in the hatchling database 216. In other words, the decision of next processing station for a given hatchling carrier may depend on the results of processing in one or more of the previous processing stations visited by the hatchling carrier. This provides a capability to optimize the processing of each hatchling based on the characteristics of that hatchling.

Alternatively, the flow control algorithm 214 may be static such that each loaded hatchling carrier flows through exactly the same processing sequence. As another example, the flow control algorithm 214 may be dynamic, such that for each processing station visited, when the processing is complete, the control system 202 may determine one or more of the successive processing stations for each loaded hatchling carrier based on the processing of the hatchling carrier up to that point. The determination may be made with reference to the hatchling database 216 to access the previous results for that hatchling carrier. Alternatively, such decisions may be made based on information encoded on the hatchling carrier or the hatchling itself.

The flow control algorithm 214 may preferably be capable of defining all the possible processing sequences that may occur in a system. Each unique path through the flow control algorithm 214 may define a possible processing sequence for a hatchling carrier. Each hatchling in a hatchling carrier may be associated with a processing sequence that includes all the processing stations at which the hatchling carrier undergoes processing as determined by the flow control algorithm 214, and may be further determined by the characteristics of the specific hatchling.

It may be desirable that the conveying system 208 be capable of providing the paths that are called for by the processing control algorithm 214. In other words, whatever next processing station decisions are made by the flow control algorithm 214, the conveying system 208 may preferably be capable of providing a path from the current processing station to the next processing station as determined by the flow control algorithm 214. The conveying system 208 may be preferably modular such that it may be modified to provide the connectivity called for by the flow control algorithm 214.

The control apparatus 212 may preferably include a communications interface 218 that interfaces the external interconnection network 210 to the control apparatus 212. The interconnection network 210 connects to the processing stations 204 and conveying system 208. The interconnection network 210 may provide a communication path between the processing stations 204 and the control apparatus 212, and between the conveying system 208 and the control apparatus 212. As the control apparatus 212 executes the flow control algorithm 214, the control apparatus 212 may receive status information and send command information to both the processing stations 204 and the conveying system 208, to facilitate processing of each of the loaded hatchling carriers processing in the system.

As discussed herein, the hatching carriers may include an ID tag to identify the hatching carriers (and preferably the hatchlings within them) as the loaded hatching carriers are processed through the system. This ID tag may be used by the control system 202 to identify the hatchling carrier, and the data associated with it. For example, the data generated by processing stations for a specific hatching carrier may be stored in the hatchling database 216 using the ID tag as an addressing label. Later, the data associated with the hatchling carrier may be accessed using the ID tag. The ID tag may be the mechanism used to store and access data related to a particular hatchling carrier, and may provide individualized processing (if desired) for each hatchling carrier.

Figure 6:
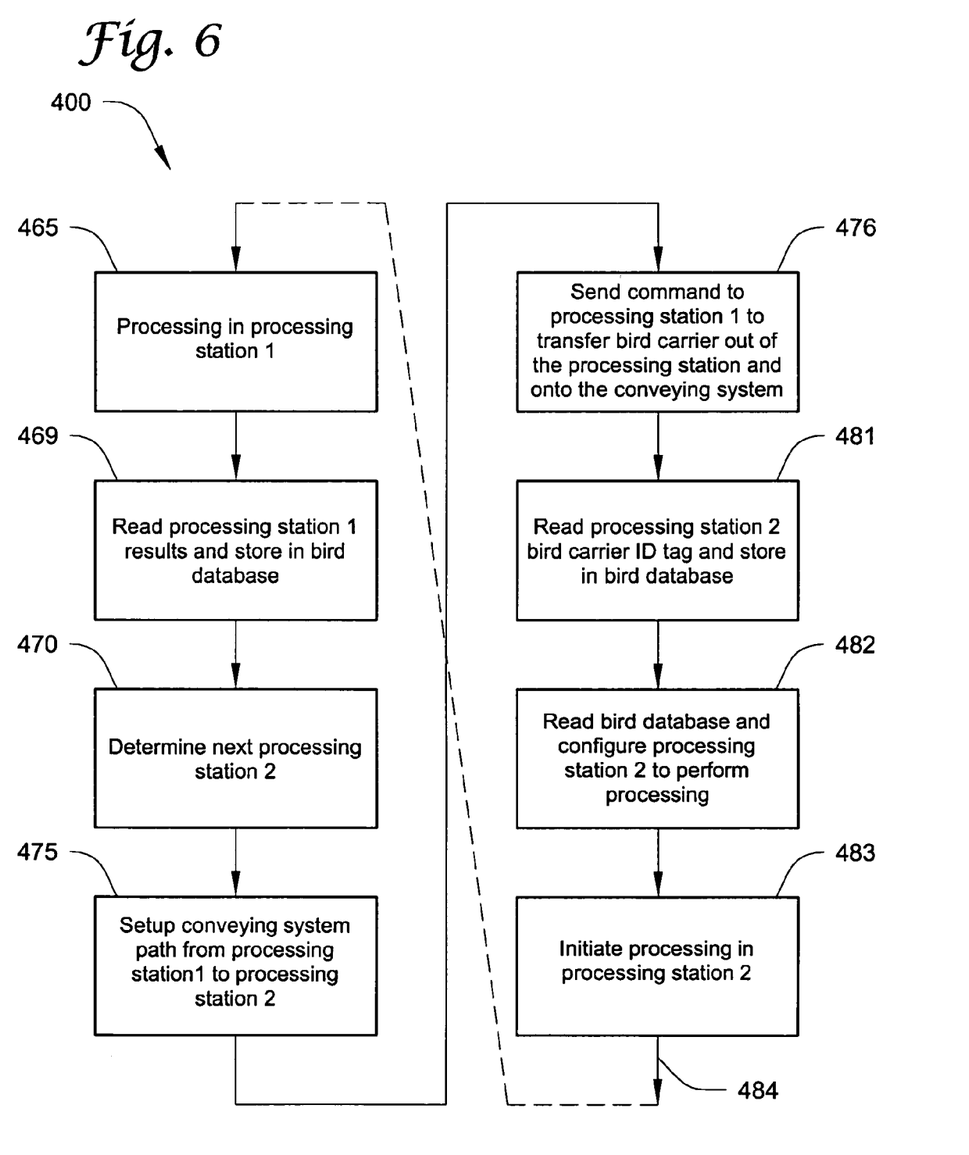
FIG. 6 illustrates one embodiment of a general flow control algorithm shown in FIG. 5.

FIG. 6 represents only one illustrative embodiment of a general flow control algorithm 400 that could potentially be used with hatchling carriers that include an ID tag. This flow control algorithm 400 may be used to determine the processing sequence of each loaded hatchling carrier through the system. The description of FIG. 6 will be given with respect to one hatchling carrier, however, in the hatchling processing system, the flow control algorithm may preferably concurrently provide control for each hatchling carrier in the system.

The embodiment depicted in FIG. 6 illustrates operation of the control system beginning with a hatchling carrier being processed in processing station 1 (block 465). After the control system initiates the processing in processing station 1, the control system may monitor the status of processing station 1 to determine when the processing is completed. When the processing in processing station 1 is completed, the control system may read the status from processing station 1 to obtain the results of the processing and may store the results in the hatchling database (block 469).

As further shown in FIG. 6, the control system may determine the next processing station for the hatchling carrier currently in station 1 (block 470). This determination may be made taking into consideration the results of the processing in station 1, along with previous status and results related to the hatchling carrier (if any) as stored in the hatchling database: Thus, the flow control algorithm 400 may be dynamic in that the next processing station may not be determined until processing at the current processing station is completed.

Once the next processing station has been determined (in FIG. 6 the next processing station is referred to as processing station 2), the control system may read the status of processing station 2 to determine if the station is busy or available. If processing station 2 is busy, the control system may continue to monitor until the processing station 2 becomes available. Once processing station 2 is available, the control system may perform a setup of the conveying system path from processing station 1 to processing station 2 (block 475). Next, the control system may send a command to processing station 1 to transfer the hatchling carrier out of processing station 1 and onto the conveying system (block 476). The conveying system may transport the hatchling carrier from processing station 1 to processing station 2. Once the hatchling carrier arrives in processing station 2, the control system may send a command to processing station 2 to read the ID tag of the hatchling carrier (block 481). The control system may receive the ID tag information and store it in the hatchling database. Next, the control system may configure processing station 2 to perform the processing on the hatchling carrier (block 482). Then, the control system may send a command to initiate the processing in processing station 2 (block 483). The flow control algorithm of FIG. 6 ends at block 484, however, the algorithm may repeat (e.g., in this example, the flow control algorithm may repeat, however, now block 465 begins with processing station 2).

A flow control algorithm may include any resource scheduling or resource management techniques known to one skilled in the art.

Figure 7:
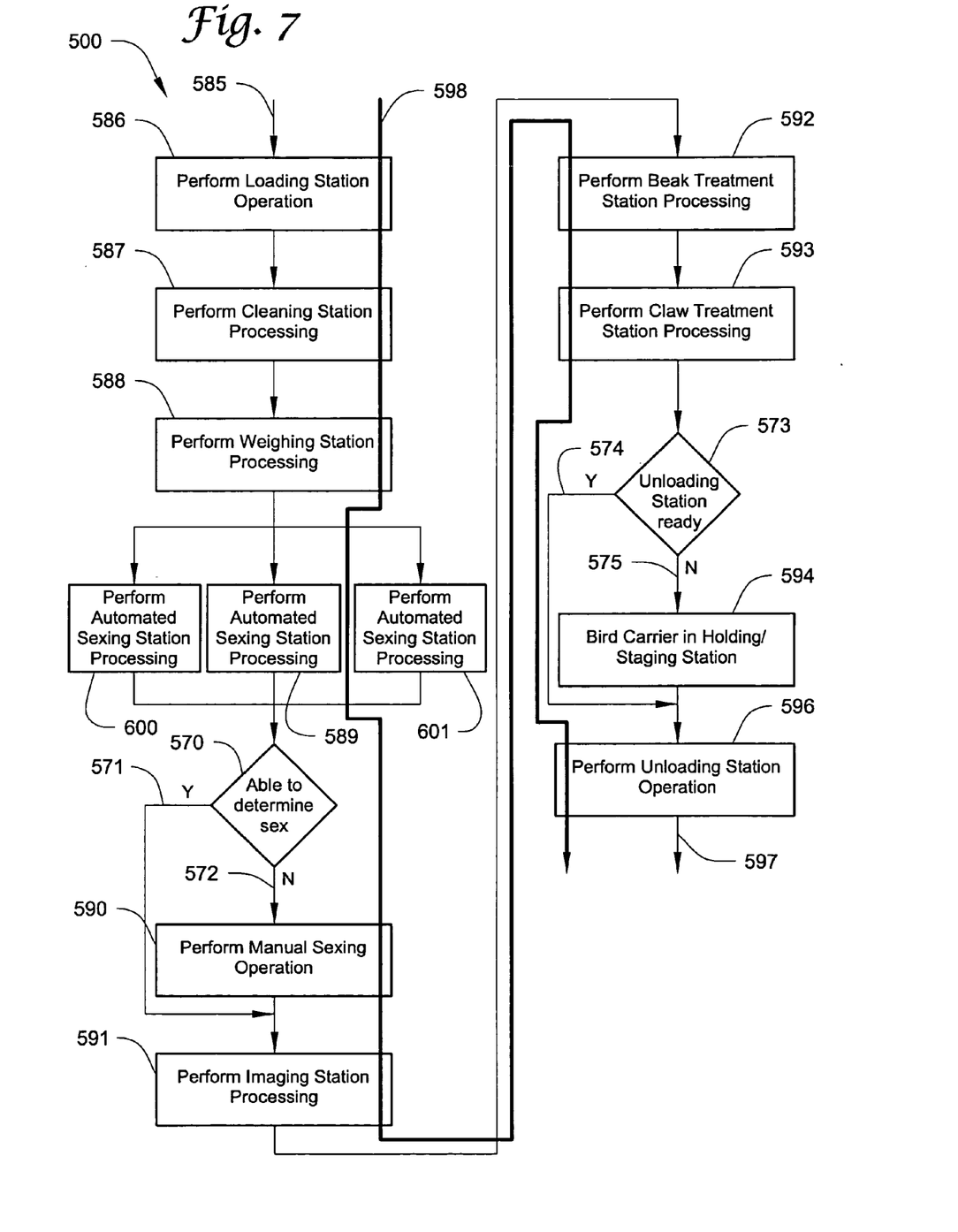
FIG. 7 is a flow diagram illustrating one embodiment of a flow control algorithm and a related processing sequence.

FIG. 7 is a flow diagram illustrating only one embodiment of a flow control algorithm 500 and a related processing sequence 598. FIG. 7 defines a series of processing stations that a hatchling carrier may visit and, for each station visited, how to determine the next processing station for that hatchling carrier. FIG. 7 will be described for use with a centralized control system, although any type of control system known to one skilled in the art, including a centralized control system or a distributed control system, may be used. The description will be given with respect to one hatchling carrier, however, in the hatchling processing system, the control system may preferably concurrently provide control for each hatchling carrier in the system.

As shown in FIG. 7, the flow control algorithm 500 defines how to determine the next processing station for each hatchling carrier. In contrast, the processing sequence 598 of a hatchling carrier is the sequence of processing stations that a specific hatchling carrier visits. In other words, the set of possible processing sequences that any particular hatchling carrier may take corresponds to the set of possible paths through the flow control algorithm.

For example, the processing sequence 598 shown in FIG. 7 includes a loading station 586; a cleaning station 587; a weighing station 588; an automated sexing station 589; a manual sexing station 590; an imaging station 591; a beak treatment station 592; a claw treatment station 593; and an unloading station 596.

The flow control algorithm 500 may begin with a hatchling 585 to be processed. The first station, a loading station 586, may load a hatchling 585 into a hatchling carrier. The hatchling carrier both constrains and positions the hatchling. The hatchling may be restrained in a fixed position within the hatchling carrier to facilitate later processing steps. The loading station 586 may be manual such that a person places the hatchling into the hatchling carrier, or it may be automated such that the loading station 586 includes a mechanism to capture and manipulate one hatchling, and place the hatchling in a hatchling carrier. Placing the hatchling in a hatchling carrier provides a mechanism for transporting the hatchlings from one processing station to the next, and also provides a standard method for each processing station to receive and access the hatchling. The hatchling carrier may also provide singulation such that each processing station does not need to separate or untangle two or more hatchlings.

For example, a loading station 586 may access a group of hatchlings stored in a shed, to capture a single hatchling and convey the hatchling into a hatchling carrier. One example of a loading station 586 is described in U.S. Pat. No. 6,443,102 (Schepers et al.).

After the hatchling has been loaded into a hatchling carrier at the loading station 586, the loading station 586 may provide information to the control system related to the process. For example, such information may include the ID tag of the hatchling carrier, the time the hatchling was loaded into the hatchling carrier, species of the hatchling, a batch number, source code (indicating the provider of the hatchling), etc.

Following the loading station 586 processing, the flow control algorithm of FIG. 7 may determine that the next processing station is the cleaning station 587. The control system may perform the operations as described in FIG. 6 to transfer the hatchling carrier from the loading station 586 to the cleaning station 587. The cleaning station may be used to remove dirt and excrement from the hatchling to, e.g., facilitate further processing. The cleaning station 587 accesses the hatchling for cleaning, and then performs the cleaning.

As further shown in FIG. 7, the flow control algorithm may determine that the next processing station may be the weighing station 588. The control system may perform the operations as described in FIG. 6 to transfer the hatchling carrier from the cleaning station 587 to the weighing station 588. The weighing station 588 may perform a measurement to determine the weight of the hatchling. The weighing station 588 may access the hatchling and perform a measurement of the hatchling's weight.

After the hatchling has been weighed, the weighing station 588 may provide information to the control system related to the process. For example, such information may include the ID tag of the hatchling carrier and the weight of the hatchling. Thereafter, the weight of the hatchling may be available as data for subsequent processing stations, which may use the weight as information to optimize the processing.

Following the weighing station 588 process, the flow control algorithm of FIG. 7 may determine that the next processing station may be an automated sexing station. As shown in FIG. 7, the system includes three separate bays 589, 600, and 601. The use of multiple bays may be beneficial, for providing an increased processing rate for the system. For example, if the duration of the processing time for the automated sexing station was significantly longer than the processing times of other types of stations in the system, multiple automated sexing bays may be used as shown in FIG. 7 to decrease the effective processing time. This technique may be used with most types of processing stations.

In FIG. 7, automated sexing station is determined to be the next processing station. The control system may perform the operations as described in FIG. 6 to transfer the hatchling carrier from the weighing station 588 to one of the bays 589, 600, 601 of the automated sexing station.

There are many advantages to hatching sexing. For example, in the broiler industry, the growth characteristics of the male and female chickens are different. The males tend to grow faster and larger at given conditions. Thus, raising male and female chickens separately may be advantageous. Another potential advantage of sexing may be processing line efficiency. With the hatchlings sorted by sex, the processing line handling the males may be configured to handle larger hatchlings efficiently, and corresponding, the processing line handling the females may be configured to handle smaller hatchlings. When the system provides more uniform sized hatchlings to the equipment, the equipment may provide improved yield, efficiency, and productivity.

Some examples of an automated sexing station 589 for poultry chicks is described in U.S. Pat. No. 6,396,938 (Tao et al.); U.S. Pat. No. 6,512,839 (Toelken), U.S. Pat. No. 4,417,663 (Suzuki); and U.S. Patent Application Publication US2001/0035370 (Yavnai et al.).

After processing in the automated sexing station such that the gender of the hatchling may be determined, the automated sexing station may provide information to the control system related to the operation. For example, such information may include the ID tag of the hatchling carrier and the gender of the hatchling. Thereafter, the gender of the hatchling may be available as data to future processing stations, which may use the gender of the hatchling as information to optimize the processing.

As further shown in FIG. 7, the flow control algorithm may determine the next processing station for the hatchling carrier. In this case, the flow control algorithm may access the information written into the hatchling database to determine the next processing station 570. If the hatchling database information indicates that the gender was determined, then the next processing station may be the imaging station 591.

In some instances, the automated sexing station was unable to determine the gender of the hatchling. If the gender of the hatchling was not determined by the automated sexing stations, then the next processing station may be a manual sexing station 590. In FIG. 7, the automated sexing station was unable to determine the sex of the hatchling 572 and therefore the next processing station may be the manual sexing station 590. The control system may perform the operations as described in FIG. 6 to transfer the hatchling carrier from the automated sexing station to the manual sexing station 590.

Manual sexing stations 590 may provide for the gender of the hatchling to be determined manually by a person. The person may typically access the hatchling through or in the hatchling carrier and make a determination of the gender. Once the sex of the hatching has been determined, the person may input information to the control system related to the operation. For example, such information may include the ID tag of the hatchling carrier and the gender of the hatchling.

As an alternative to a manual sexing station for those hatchlings that cannot be accurately sexed in their first pass through an automated sexing station, the system may route such hatchlings (and their hatchling carriers) to a holding or staging area. In some instances, sexing operations may be more successful as the hatchling ages. As a result, waiting for a period of time may allow a hatchling that was not accurately sexed during the first pass to be sexed during a later pass through an automated sexing station. Such a system may obviate the need for a backup manual sexing station.

After the gender of the hatchling has been determined, the flow control algorithm of FIG. 7 indicates that the next processing station may be the imaging station 591. As shown in FIG. 7, the control system may perform the operations as described in FIG. 6 to transfer the hatchling carrier from the manual sexing station 590 to an imaging station 591.

The imaging station 591 may be used to form images of the hatchling, where the images represent some aspect of the hatchling. These images may be formed using a variety of methods. For example, the image may be a photograph, or the image may be formed using ultrasound, ultraviolet light, infrared light, or any other image forming method. The imaging station may preferably access and position the hatchling to form the desired image. In addition, image processing may be performed to determine some trait or characteristic of the hatchling, for example, some physical trait or abnormality.

Once the imaging and any selected image processing are completed, the imaging station 591 may provide information to the control system related to the operation. For example, such information may include the ID tag of the hatchling carrier, one or more images of the hatchling, and traits or characteristics of the hatchling determined from image processing.

It should be understood that imaging may be performed at other points within the systems and methods of the present invention. For example, an imaging station may be used before a hatchling enters any of the processing stations or at least as the hatchling is loaded into a hatchling carrier. Such "pre-processing" imaging may be used to, e.g., grade hatchlings based on physical abnormalities, size, etc. and that information may be used to, e.g., place a hatchling in a different size hatchling carrier, prevent the hatchling from entering the system, etc.

Imaging may also be used after processing a hatchling to determine whether, e.g., the hatchling was properly processed. Such "post-processing" imaging may be used to verify that a hatchling was properly treated within, e.g., a beak treatment station, claw treatment station, cleaning station, marking station, etc. If the imaging indicates that treatment was not performed properly, the hatchling could potentially be routed back through the same process, an alarm may be tripped (e.g., audible, visual, etc.) to indicate that a processing station may not be operating within acceptable parameters, the hatchling could be directed to a holding/staging station, etc.

After the imaging station 591 processing is completed, the flow control algorithm of FIG. 7 may determine that the next processing station will be the beak treatment station 592. The control system may then perform the operations as described in FIG. 6 to transfer the hatchling carrier from the imaging station 591 to the beak treatment station 592.

One example of a beak treatment station is described in U.S. Pat. No. 5,651,731 (Gorans et al.). Other examples of beak treatment stations 592 are described in U.S. Pat. Nos. 4,375,814; 4,446,819; and 4,951,610 (all to Gourlandt). It should be understood that in some instances, the beak treatment station 592 may involve treatment of the upper beak alone, the lower beak alone, or the upper and lower beaks (either simultaneously or sequentially). Examples of beak treatment stations may also be described in, e.g., U.S. patent application Ser. No. 10/346,981, titled APPARATUS AND METHOD FOR UPPER AND LOWER BEAK TREATMENT, filed Jan. 17, 2003 and U.S. patent application Ser. No. 10/702,369, titled BEAK TREATMENT WITH TONGUE PROTECTION, filed on Nov. 6, 2003.

Following the beak treatment process, the beak treatment 592 station may provide information to the control system related to the operation. For example, such information may include the ID tag of the hatchling carrier.

After the beak treatment station 592 operation has been completed, the flow control algorithm of FIG. 7 may determine that the next processing station may be the claw treatment station 593. The control system may perform the operations as described in FIG. 6 to transfer the hatchling carrier from the beak treatment station 592 to the claw treatment station 593.

The claw treatment station may preferably access and position the hatchling to perform the claw treatment. One example of a claw treatment station 593 is described in U.S. Pat. No. 5,195,925 (Gorans et al.). Once the claw treatment is completed, the claw treatment station 593 may provide information to the control system related to the operation. For example, such information may include the ID tag of the hatchling carrier.

After the claw treatment station 593 processing has been completed, the flow control algorithm of FIG. 7 may determine the next processing station for the hatchling carrier. The flow control algorithm may access status information related to unloading station 596, to determine whether unloading station 596 contains a hatchling carrier or not 573. If the unloading station 596 is ready to receive a hatchling carrier 574, the next processing station may be the unloading station 596. If the unloading station is not ready to receive another hatchling carrier 575, then the next processing station may be the holding/staging station 594. In FIG. 7, the unloading station 596 is ready to receive a hatchling carrier, so the next processing station will be the unloading station 596. The control system may perform the operations as described in FIG. 6 to transfer the hatchling carrier from the claw treatment station 593 to the unloading station 596.

The unloading station 596 may remove the hatchling from the hatchling carrier and may place the processed hatchling in some type of container. The output of the unloading station 596 may be to place processed hatchlings in some type of container 597. An example of an unloading station 596 would be a boxing station, in which a hatchling may be removed from the hatchling carrier and placed in a box. The unloading station 596 may be manual, such that a person removes the hatchling from the hatchling carrier and places it in the shipping container, or it may be automated such that the unloading station includes a mechanism to remove the hatchling from the hatchling carrier and place the hatchling in a container.

After the hatchling has been unloaded from the hatchling carrier and loaded into a container, the unloading station 596 may provide information to the control system related to the operation. For example, such information may include the ID tag of the hatchling carrier and the time the hatchling was unloaded from the hatchling carrier.

In some systems and methods, it may be preferred to segregate hatchlings at the unloading station 596 based on one or more physical characteristics (e.g., gender, size, etc.) and/or based on one or more processes that may have been performed on the hatchlings (e.g., inoculations, beak treatments, claw treatments, etc.). Such segregation may provide an opportunity for the processor to provide hatchlings that meet some desired criteria based on physical characteristics, processes performed on the hatchlings, etc.

FIG. 7 also depicts a holding/staging station 594, which was not part of the processing sequence 598, but is included in the flow control algorithm 500. A holding/staging station 594 may be used, for example, as a temporary holding area for hatchling carriers awaiting subsequent processing. For example, in FIG. 7, the holding/staging station 594 may be used to hold hatchling carriers waiting to move to the unloading station 596.

In other systems/methods, a holding/staging station could be used at any point in the processing of a hatchling to, e.g., age a hatchling if the accuracy of an automated sexing operation could be increased with age. In still other systems/methods, a separate holding/staging station could be used to provide time for analysis of data collected at different station, to provide time for analysis or testing of tissue collected from a hatchling at a different station, to provide time for an agent introduced into a bird to act (e.g., a pharmaceutical agent, etc.), or for any other purpose for which it is desired to retain control over individual, identifiable hatchlings within the system/method.

Once a hatchling carrier enters the holding/staging station 594, the holding/staging station 594 may provide information to the control system related to the operation. For example, such information may include the ID tag of the hatchling carrier and the time the hatchling entered the holding/staging station.

Additional examples of types of processing stations that may be used in the system include, but are not limited to inoculation stations (such as, for example, the stations described in U.S. patent application Ser. No. 10/702,988, titled APPARATUS AND METHODS FOR NASAL DELIVERY OF COMPOSITIONS TO BIRDS, filed on Nov. 6, 2003), gavage stations, marking stations, tissue sampling stations, diagnostic stations, etc.

All references cited herein are incorporated in their entirety as if each were incorporated separately. This invention has been described with reference to illustrative embodiments and is not meant to be construed in a limiting sense. Various modifications of the illustrative embodiments, as well as additional embodiments of the invention, will be apparent to persons skilled in the art upon reference to this description.

What is claimed is:

1. A method for processing hatchlings, the method comprising:
   loading a hatchling into each hatchling carrier of a plurality of hatchling carriers to provide a plurality of loaded hatchling carriers, wherein each loaded hatchling carrier is capable of restraining only one hatchling at a time;
   determining a processing sequence in a processing system comprising a plurality of processing stations for each loaded hatchling carrier, wherein determining the processing sequence comprises selecting two or more of the processing stations at which the hatchling will undergo processing;
   processing each hatchling in each of the loaded hatchling carriers in the two or more selected processing stations of the processing sequence; and
   transporting each loaded hatchling carrier between the two or more processing stations using an automated conveying system connecting the plurality of processing stations;
   wherein each hatchling carrier comprises an identification tag associated therewith;
   and wherein the processing sequences for two or more of the loaded hatchling carriers are different.

2. A method according to claim 1, wherein the plurality of processing stations comprises at least one data collection station at which hatchling data is collected and at least one functional station at which the hatchling is changed, and further wherein selecting two or more of the processing stations at which the hatchling will undergo processing comprises selecting at least one data collection station and at least one functional station.

3. A method according to claim 1, further comprising assigning the identification tag to each hatchling carrier.

4. A method according to claim 1, further comprising assigning the identification tag to the hatchling carrier after loading the hatchling carrier, wherein at least a portion of the identification tag is based on a characteristic of the hatchling in the loaded hatching carrier.

5. A method according to claim 1, wherein determining the processing sequence for each hatchling in each loaded hatchling carrier comprises selecting the two or more processing stations at which the hatchling will undergo processing before processing the hatchling at any of the selected processing stations of the processing sequence.

6. A method according to claim 1, wherein determining the processing sequence for each hatchling in each loaded hatchling carrier comprises selecting at least one of the two or more processing stations at which the hatchling will undergo processing after processing the hatchling in at least one of the two or more processing stations of the processing sequence.

7. A method according to claim 1, wherein the transporting comprises transporting each loaded hatchling carrier only to the selected two or more processing stations of the processing sequence for the loaded hatchling carrier.

8. A method according to claim 1, wherein the transporting comprises transporting each loaded hatchling carrier through all of the processing stations of the plurality of processing stations, and further wherein each loaded hatchling carrier is processed only at the selected two or more processing stations of the processing sequence for that loaded hatchling carrier.

9. A method according to claim 1, further comprising identifying a characteristic of each hatchling in the loaded hatchling carriers, wherein determining the processing sequence is at least partially based on the identified characteristic of the hatchling in the loaded hatchling carrier.

10. A method according to claim 9, wherein the identified characteristic comprises species or breed of the hatchling.

11. A method according to claim 9, wherein the identified characteristic comprises weight of the hatchling.

12. A method according to claim 9, wherein the identified characteristic comprises gender of the hatchling.

13. A method according to claim 1, further comprising storing information related to each hatchling in each of the loaded hatchling carrier in a database.

14. A method according to claim 13, wherein the identification tag associated with each hatchling carrier comprises the information.

15. A method according to claim 13, wherein the information comprises an image of the hatchling in each of the loaded hatchling carrier.

16. A method according to claim 1, wherein a processing station of the plurality of processing stations comprises a cleaning station.

17. A method according to claim 1, wherein a processing station of the plurality of processing stations comprises a weighing station.

18. A method according to claim 1, wherein a processing station of the plurality of processing stations comprises a sexing station.

19. A method according to claim 1, wherein a processing station of the plurality of processing stations comprises a beak treatment station.

20. A method according to claim 1, wherein a processing station of the plurality of processing stations comprises a claw treatment station.

21. A method according to claim 1, wherein a processing station of the plurality of processing stations comprises an imaging station.

22. A method according to claim 1, wherein a processing station of the plurality of processing stations comprises a holding station.

23. A method for processing hatchlings, the method comprising:
    loading a hatchling into each hatchling carrier of a plurality of hatchling carriers to provide a plurality of loaded hatchling carriers, wherein each loaded hatchling carrier is capable of restraining only one hatchling at a time;
    assigning an identification tag to each hatchling carrier;
    determining a processing sequence in a processing system comprising a plurality of processing stations for each loaded hatchling carrier, wherein determining the processing sequence comprises selecting two or more of the processing stations at which the hatchling will undergo processing, wherein the plurality of processing stations comprises at least one data collection station at which hatchling data is collected and at least one functional station at which the hatchling is changed, and further wherein selecting two or more of the processing stations at which the hatchling will undergo processing comprises selecting at least one data collection station and at least one functional station;
    identifying a characteristic of each hatchling in the loaded hatchling carriers, wherein determining the processing sequence is at least partially based on the identified characteristic of the hatchling in the loaded hatchling carrier;
    processing each hatchling in each of the loaded hatching carriers in the two or more selected processing stations of the processing sequence; and
    transporting each loaded hatchling carrier between the two or more processing stations using an automated conveying system connecting the plurality of processing stations;
    wherein the processing sequences for two or more of the loaded hatchling earners are different.

24. An automated hatchling processing system comprising:
    a plurality of processing stations comprising at least one data collection station capable of collecting data regarding a hatchling and at least one functional station capable of changing the hatchling;
    an automated conveying system connecting the plurality of processing stations;
    a plurality of hatchling carriers adapted to travel along the automated conveying system between the plurality of processing stations, wherein each hatchling carrier is capable of restraining only one hatchling at a time;
    an identification tag associated with each hatchling carrier of the plurality of hatchling carriers; and
    a control system operatively connected to the automated conveying system and the plurality of processing stations, the control system routing the plurality of hatchling carriers along the automated conveying system and activating the plurality of processing stations as needed.

25. A system according to claim 24, wherein the plurality of processing stations comprises a weighing station, a beak treatment station, and a claw treatment station.

26. A system according to claim 24, wherein control system comprises a central controller controlling the automated conveying system and the plurality of processing stations.

27. A system according to claim 24, wherein the control system comprises a distributed control system comprising two or more computing elements controlling different components of the automated hatchling processing system.

28. A system according to claim 24, wherein the automated conveying system connects one or more of the processing stations in a parallel configuration.

29. A system according to claim 24, wherein the automated conveying system connects the one or more of the processing stations in a serial configuration.

30. A system according to claim 24, wherein one or more of the processing stations comprise two or more bays.

* * * * *

UNITED STATES PATENT AND TRADEMARK OFFICE
CERTIFICATE OF CORRECTION

PATENT NO. : 7,004,112 B2 Page 1 of 1
APPLICATION NO. : 10/702370
DATED : February 28, 2006
INVENTOR(S) : Marc S. Gorans It is certified that error appears in the above-identified patent and that said Letters Patent is hereby corrected as shown below:

Column 18, line 19, please delete "earners" and replace with --carriers--.

Signed and Sealed this

First Day of April, 2008

JON W. DUDAS
*Director of the United States Patent and Trademark Office*